US008215188B2

(12) United States Patent
Klimenko et al.

(10) Patent No.: US 8,215,188 B2
(45) Date of Patent: Jul. 10, 2012

(54) TORSION ANGLE SENSOR

(75) Inventors: Valeri Klimenko, Munich (DE); Michael Röser, Rosenheim (DE)

(73) Assignee: Bourns, Inc., Riverside, CA (US)

( * ) Notice: Subject to any disclaimer, the term of this patent is extended or adjusted under 35 U.S.C. 154(b) by 202 days.

(21) Appl. No.: 12/710,893

(22) Filed: Feb. 23, 2010

(65) Prior Publication Data
US 2010/0224011 A1    Sep. 9, 2010

(30) Foreign Application Priority Data
Mar. 5, 2009 (DE) .......... 10 2009 011 352

(51) Int. Cl.
*G01L 3/02* (2006.01)
*G01L 3/00* (2006.01)

(52) U.S. Cl. .......... 73/862.328; 73/862.31; 73/862.325; 73/862.331

(58) Field of Classification Search ............. 324/207.11, 324/207.13, 207.25, 207.16–207.17, 207.2; 73/862.326, 862.328, 862.331, 862.325, 73/862.321
See application file for complete search history.

(56) References Cited

U.S. PATENT DOCUMENTS

| | | | |
|---|---|---|---|
| 2,724,266 A * | 11/1955 | Baker et al. ................ | 73/862.31 |
| 5,930,905 A * | 8/1999 | Zabler et al. ................ | 33/1 PT |
| 6,246,232 B1 * | 6/2001 | Okumura ................ | 324/207.2 |
| 6,367,337 B1 * | 4/2002 | Schlabach ................ | 73/862.331 |
| 6,720,762 B2 * | 4/2004 | Okumura ................ | 324/207.21 |
| 6,732,438 B2 * | 5/2004 | Enzinna ................ | 33/1 PT |
| 6,983,647 B2 * | 1/2006 | Nagaoka et al. ........... | 73/117.02 |
| 7,017,274 B2 * | 3/2006 | Stobbe ................ | 33/1 PT |
| 7,021,161 B2 * | 4/2006 | Recio et al. ................ | 73/862.333 |
| 7,085,638 B2 * | 8/2006 | Knoll ................ | 701/41 |
| 7,144,346 B2 * | 12/2006 | Hermann et al. ................ | 475/19 |
| 7,665,572 B2 * | 2/2010 | Yamanaka et al. ............ | 180/444 |
| 7,677,114 B2 * | 3/2010 | Deshmukh et al. ....... | 73/862.328 |
| 7,772,836 B2 * | 8/2010 | Isobe et al. ................ | 324/207.25 |
| 2003/0094054 A1 * | 5/2003 | Font ................ | 73/862.328 |
| 2005/0022617 A1 * | 2/2005 | Sano ................ | 73/865.9 |
| 2009/0224500 A1 * | 9/2009 | Raschke et al. ............ | 280/93.5 |

FOREIGN PATENT DOCUMENTS

| | | |
|---|---|---|
| GB | 704782 | 3/1954 |
| GB | 764977 | 1/1957 |

* cited by examiner

*Primary Examiner* — Lisa Caputo
*Assistant Examiner* — Jonathan Dunlap
(74) *Attorney, Agent, or Firm* — Senniger Powers LLP

(57) ABSTRACT

A torsion angle sensor for measuring the torsion angle of two shafts coupled with one another having two planetary gear sets coupled via a shared planet carrier, with the sun gear of each gear set being connected to one of the two shafts respectively; including an arrangement whereby when a torsion angle is created between the two shafts, a movable internal gear of one of the planetary gear sets is rotated corresponding to the torsion angle, with its outer surface driving a sensor gear, which is connected to a rotational position sensor, the output signal of which is proportional to the torsion angle.

17 Claims, 5 Drawing Sheets

TORSION ANGLE SENSOR

REFERENCE TO RELATED APPLICATION

This application claims priority to German application 102009011352.5, filed Mar. 5, 2009.

FIELD OF THE INVENTION

The invention relates to a torsion angle sensor according to the preamble to patent claim 1.

BACKGROUND

DE 101 60 717 A1 (U.S. Pat. No. 7,144,346 B2) discloses a torsion angle sensor for measuring the torsion angle of two shafts coupled with one another.

A preferred application for the present invention is in the steering systems of motor vehicles, in which the forces exerted on the steering assembly as torque are also measured. For example, a steering gear shaft connected to the steering wheel of a motor vehicle is coupled via a torsion bar to a pinion shaft, which is connected to the steering gear. Torque that is generated between steering gear shaft and pinion shaft twists the torsion bar, causing steering gear shaft and pinion shaft to rotate in opposite directions. The relative twisting of steering gear shaft and pinion shaft is referred to as the torsion angle. This torsion angle corresponds to the torque acting on the torsion bar.

The process of measuring the angle of rotation of the two shafts in relation to a reference angle is known in the prior art. The difference between the two measured angles then corresponds to the torsion angle. This measurement can be taken magnetically (US 2003/0062890 A1, DE 100 60 287 A1), optically (DE 100 41 095 A1) or generally using other rotational position sensors (DE 101 60 717 A1, DE 198 34 322 A1, DE 10 2007 058 657 A1, EP 1 925 533 A1, DE 102 45 975 A1, FR 2 563 795 A1).

In general, however, with all known torsion angle sensors a difference signal must be generated from at least two sensors, requiring the use of a computing system; the use of at least two sensors also increases the probability of failure.

In DE 102 45 975 A1, the steering gear shaft and the pinion shaft are coupled with one another via a double planetary gear set to form a power steering mechanism, specifically such that a first planet carrier is non-rotatably connected to the steering gear shaft and a second planet carrier is non-rotatably connected to the pinion shaft. The two sun gears of the planetary gear set are also connected to one another there. The internal gear of the planetary gear set that is coupled to the steering gear shaft is non-rotatable. The internal gear of the internal gear that is connected to the pinion shaft is movable and can be actuated or impeded to generate power steering. To measure the torsion angle between steering gear shaft and pinion shaft, however, two separate rotational angle sensors are also provided, with one of these being connected to the steering gear shaft and the other to the pinion shaft.

SUMMARY OF THE INVENTION

The object of the invention is to improve upon the torsion angle sensor of the type initially described such that the torsion angle can be measured directly by a single sensor.

This object is attained with the characterizing features specified in patent claim 1. Advantageous embodiments and further improvements on the invention are specified in the dependent claims.

The invention is based upon the principle of using a double planetary gear set in such a way that the rotational position of a movable part of the double planetary gear set corresponds directly to the torsion angle in question and can be detected via a single sensor.

In the invention, therefore, the two shafts whose torsion angle will be measured are connected to one another via a torsion bar. Two planetary gear sets are provided, with the sun gear of each set being connected to one of the two shafts. The planet gears of the two planetary gear sets are mounted on a shared planet carrier. The planet gears of the first planetary gear set are enmeshed with a stationary internal gear, which is preferably also a part of the housing of the shared torsion angle sensor. The planet gears of the second planetary gear set are enmeshed with a rotatable internal gear. The rotatable internal gear is coupled with a rotational position sensor, the output signal of which corresponds directly to the torsion angle in question.

Preferably, the two planetary gear sets are embodied with backlash-free toothed gears, which is preferably accomplished via a spring elastic tensioning of the gear wheels. This effectively prevents a hysteresis effect.

The rotatable internal gear preferably has external teeth and is enmeshed with a gear wheel which is coupled with a rotational position sensor. Said sensor can be any type of rotational position sensor, with a magnetic rotational position sensor being proposed as preferable.

The stationary internal gear of the first planetary gear set is also preferably integrated into the housing and is preferably embodied in this as a single piece.

To detect the absolute rotational angle of one of the two shafts, at least one additional rotational angle sensor is coupled with the shared planet carrier, with this planet carrier also preferably having external teeth that are enmeshed with at least one sensor gear wheel. Because with many applications the measuring range for the absolute rotational angle of the shafts is greater than 360° (up to eight full revolutions with some automobile steering systems), and because the gear ratio of the first planetary gear set is ordinarily selected such that the shared planet carrier also passes over a rotational range of more than 360° in the measuring range, in an order of magnitude of 1:2, for example, two sensor gears with different numbers of teeth are coupled with the planet carrier in order to increase measuring precision, in which case two rotational position sensors are provided, resulting in a vernier effect. This also makes it possible to choose the gear ratio between the sensor gears and the gear wheel that drives these (planet carrier) such that at least one of the sensor gears executes more than one full revolution in the measuring range, in other words a revolution of more than 360°, producing a sine and a cosine signal in a known manner, from which the angle in question can be determined.

Preferably, the two planetary gear sets each have three planet gears.

In what follows, the invention will be specified in greater detail within the context of an exemplary embodiment, with reference to the set of drawings.

DETAILED DESCRIPTION OF PREFERRED EMBODIMENTS

Figure 1:
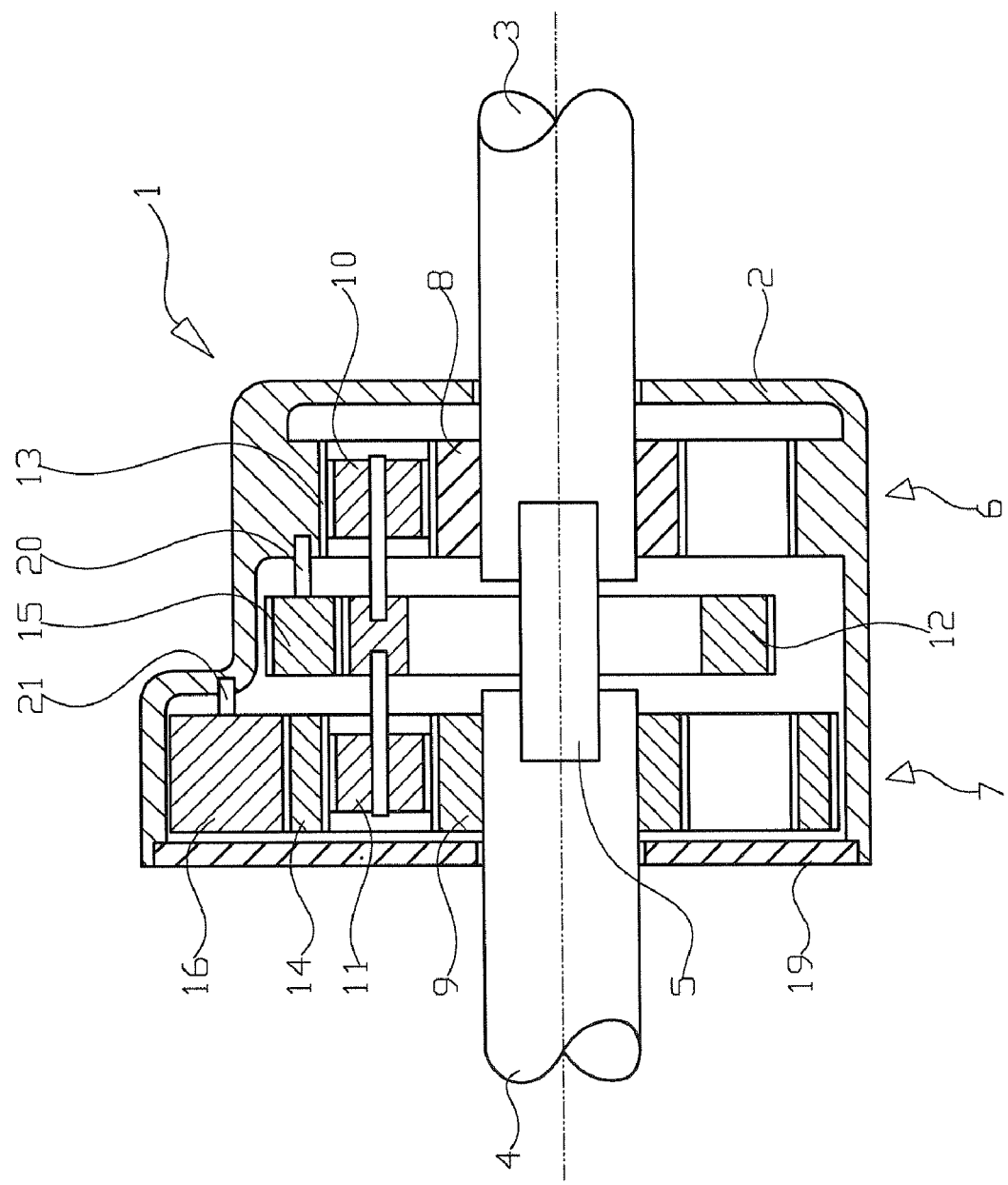
FIG. 1 a cutaway sketch illustrating the principle of the torsion angle sensor of the invention.

This application claims priority to German application 102009011352.5, filed Mar. 5, 2009, the entire disclosure of which is incorporated by reference.

The torsion angle sensor 1 has a housing 2, into which a first shaft 3, hereinafter called the steering gear shaft 3, and a second shaft 4, hereinafter called the pinion shaft 4, project. In an automobile steering system, the steering gear shaft 3 is usually connected to the steering wheel and the pinion shaft 4 to a pinion of the steering gear. The two shafts 3 and 4 are connected to one another via a torsion bar 5, the torsion of which corresponds to the torque present between steering gear shaft 3 and pinion shaft 4. With normal torsion bars, the torsion angle is linearly dependent upon the torque. In the representation shown here, the torsion angle is the relative angle of rotation between steering gear shaft 3 and pinion shaft 4.

Two planetary gear sets are arranged in the housing 2, namely a first planetary gear set 6 coupled with the steering gear shaft 3 and a second planetary gear set 7 coupled with the pinion shaft 4. A sun gear 8 of the first planetary gear set 6 is non-rotatably connected to the steering gear shaft 3, and a sun gear 9 of the second planetary gear set 7 is non-rotatably connected to the pinion shaft 4. The two planetary gear sets 6 and 7 each have three planet gears 10 and 11, respectively, although only one planet gear for each set is illustrated in FIG. 1.

All planet gears 10 and 11 are rotatably mounted on a shared planet carrier 12. The planet carrier 12 is thus positioned between the two planetary gear sets 6 and 7, and thus at the center area of the torsion bar 5.

The first planetary gear set 6 has a fixed internal gear 13, which is integrated into the housing 2. The second planetary gear set 7 has a movable, i.e., rotatable, internal gear 14.

A first sensor gear 16 is positioned on the outer surface of the movable internal gear 14 of the second planetary gear set 7, with said sensor gear being enmeshed with the movable internal gear 14 and driving a first rotational position sensor 18, not shown here (FIG. 2), the output signal of which corresponds to the torsion angle between the pinion shaft 4 and the steering gear shaft 3.

The shared planet carrier 12 is enmeshed with at least one second sensor gear 15, which is rotatably mounted fixed in the housing 2. The second sensor gear 15 drives a second rotational position sensor 17 (FIG. 2), the output signal of which corresponds to the angle of rotation of the steering gear shaft 3.

The housing 2 is sealed by a housing cover 19.

The mode of operation of the torsion angle sensor of FIG. 1 is as follows:

When one of the two shafts 3 or 4 is driven in the direction of rotation, the respective other shaft 3 or 4 is moved along with it via the torsion bar 5. At the same time, the two sun gears 8 and 9 rotate, thereby placing planet gears 10 and 11 and planet carrier 12 in rotation. When the two shafts 3 and 4 rotate in the same direction by precisely the same angle, and thus the torsion bar 5 is not twisted, the planet gears 10 and 11 roll on their respective sun gears 8 and 9 uniformly, causing the shared planet carrier 12 to rotate synchronously with the shafts 3 and 4 corresponding to the gear ratio of the planetary gear set. In this case the movable internal gear 14 does not move, therefore the first sensor gear 16 also does not move. The torsion angle "zero" is thus displayed. With a torsion angle of zero, the rotational positions of both shafts 3 and 4 are also identical.

However, if torque is exerted on the torsion bar 5 said bar will twist causing the two sun gears 8 and 9, and thus also the planet gears 10 and 11, to rotate differently. This causes the movable internal gear 14 to rotate, which drives the first sensor gear 16, which in turn drives the first torsion angle sensor 18, not shown here, the output signal of which is proportional to the torsion angle between the two shafts 3 and 4. This torsion angle is thus a measurement of the torque present between the two shafts 3 and 4.

In FIG. 1, the two planetary gear sets 6 and 7 are represented as toothed gears with radial teeth. The shared planet carrier 12 and the movable internal gear 14 also have external teeth in the form of radial teeth, which enmesh with corresponding radial teeth of the sensor gears 15 and 16.

It is obvious to one of ordinary skill in the art that other types of tooth systems may also be used, such as bevel gear teeth, for example. Friction wheels may also be used in place of teeth.

FIG. 1 shows that the two sensor gears 15 and 16 are mounted with their respective rotational axes 20 and 21 within the housing 2. As is described in connection with the exemplary embodiments of FIGS. 2 and 3, the sensor gears 15 and 16 can also be seated in separate sensor housings, with these sensor housings being stationarily arranged in housing 2.

Figure 2:
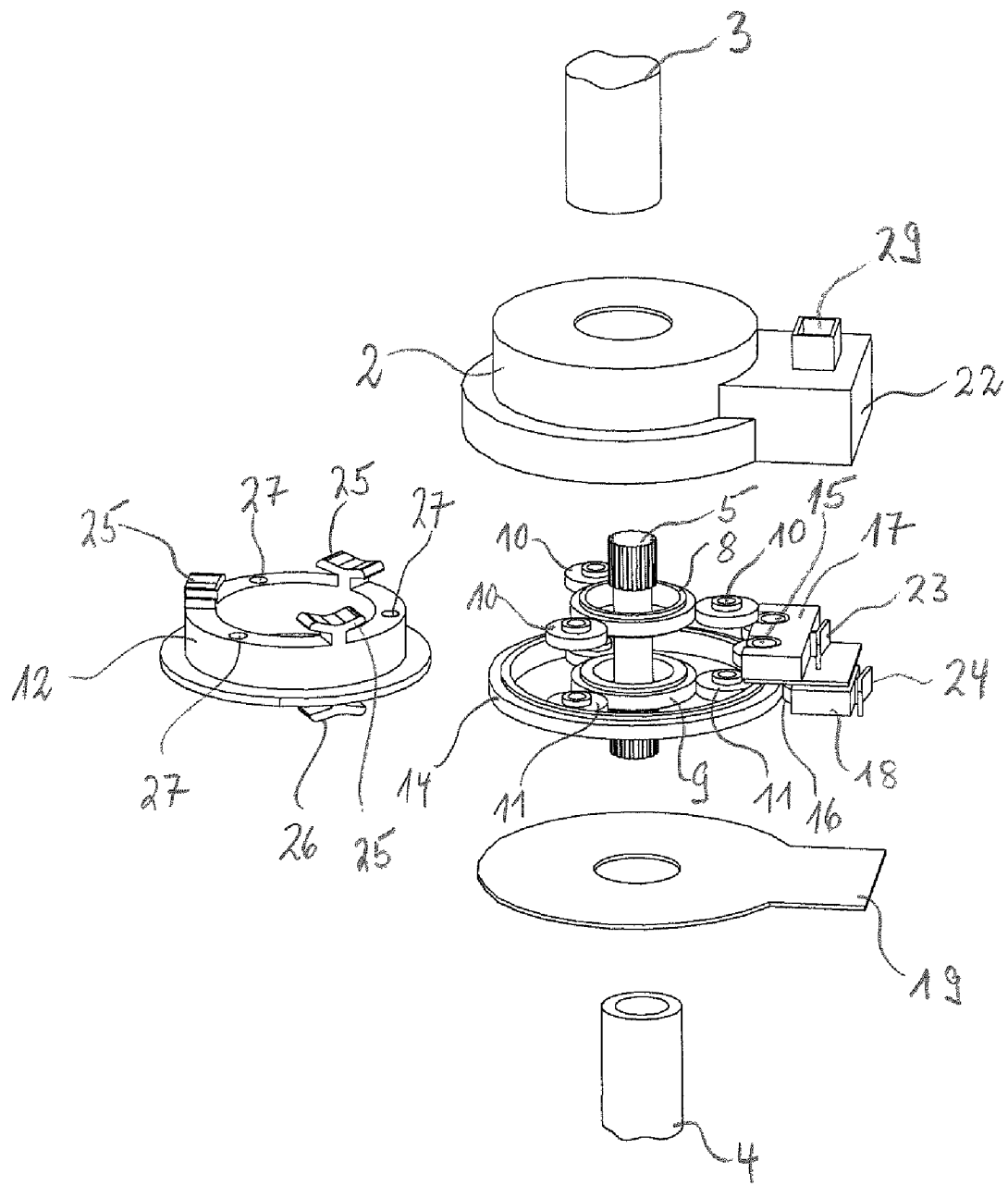
FIG. 2 a perspective, exploded, oblique view from the top of the torsion angle sensor according to the exemplary embodiment of the invention.
Figure 3:
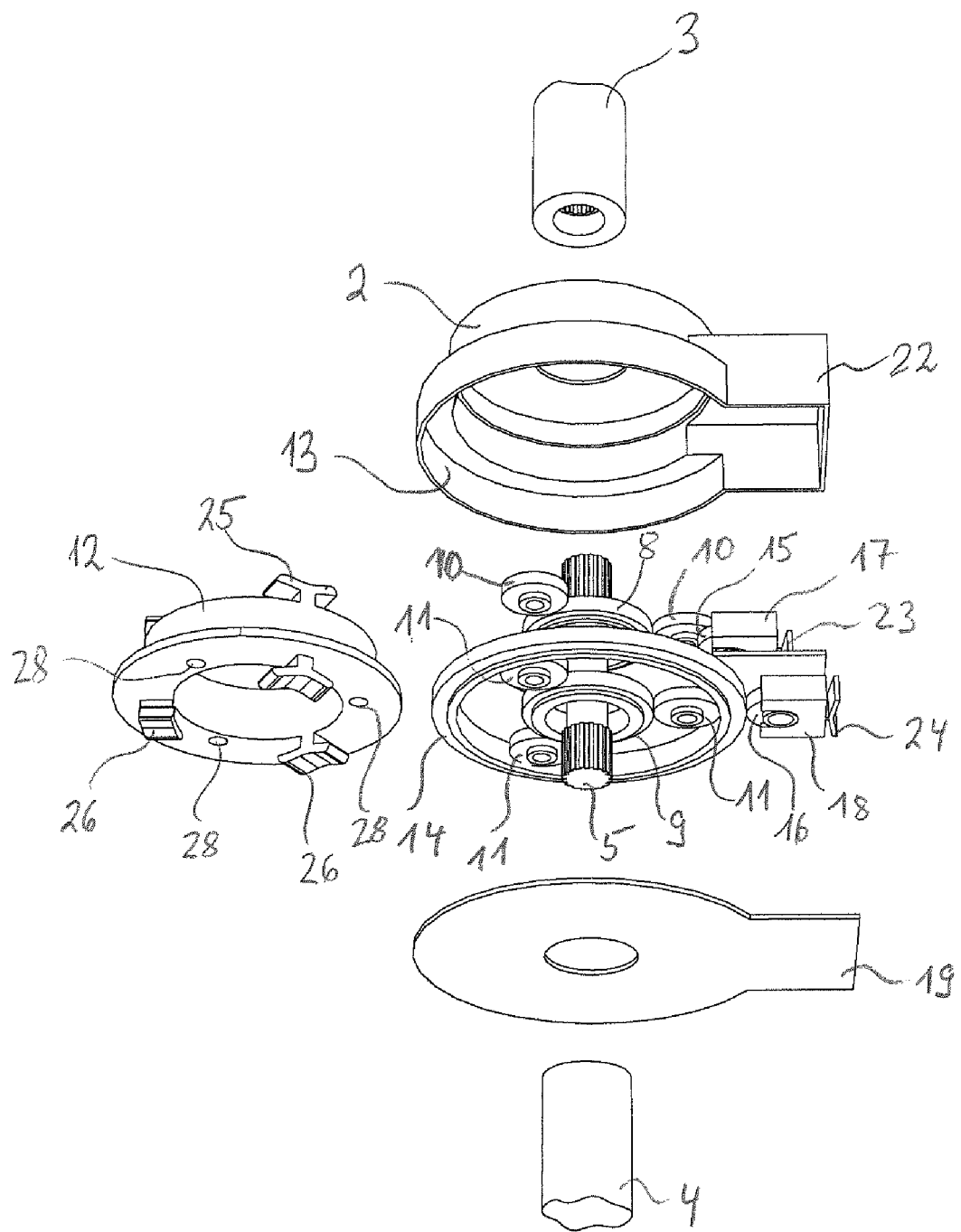
FIG. 3 a perspective, exploded, oblique view of the torsion angle sensor of FIG. 1 from the bottom.
Figure 4:
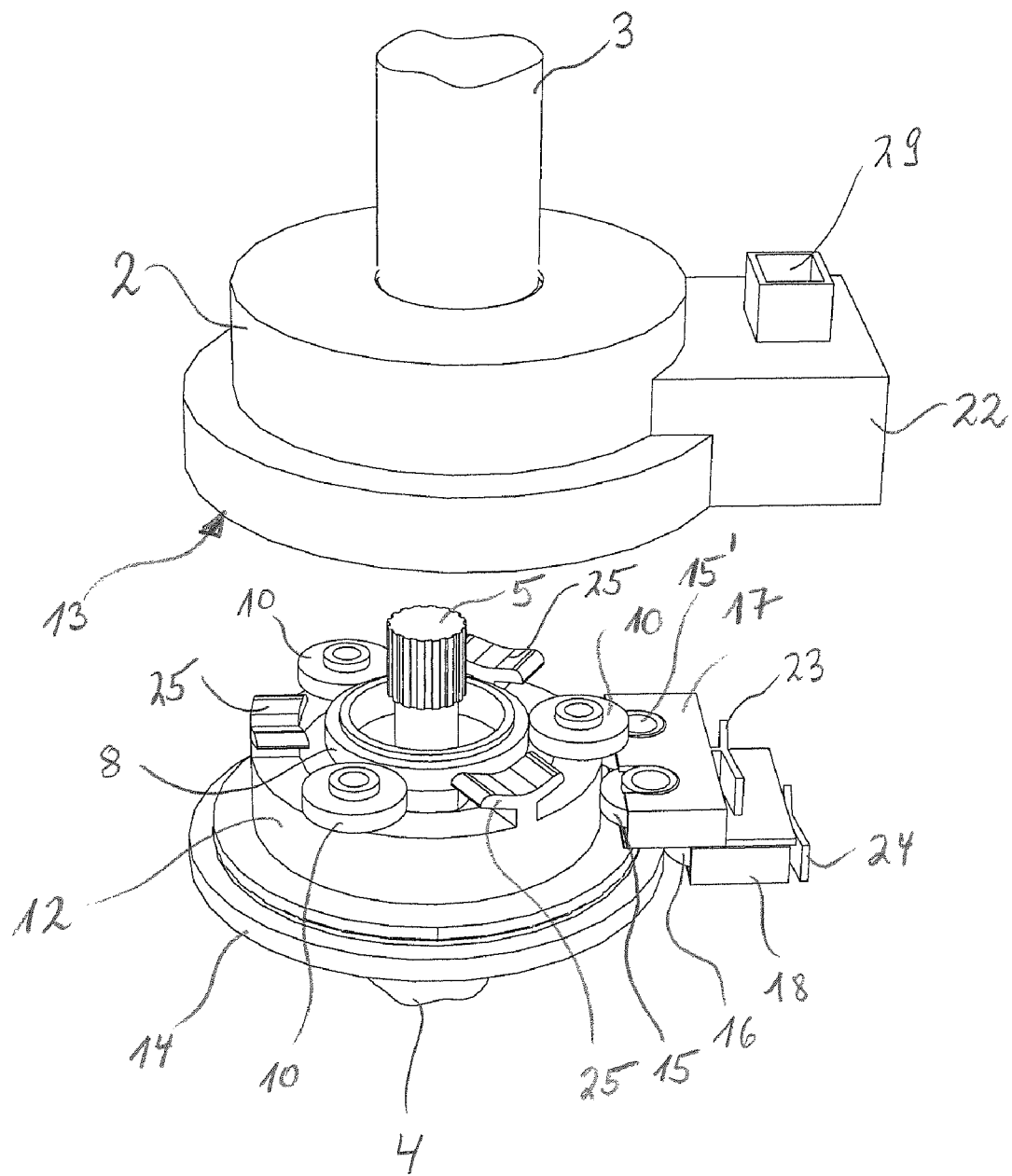
FIG. 4 a perspective, exploded, oblique view of the torsion angle sensor from the top, with the housing removed.
Figure 5:
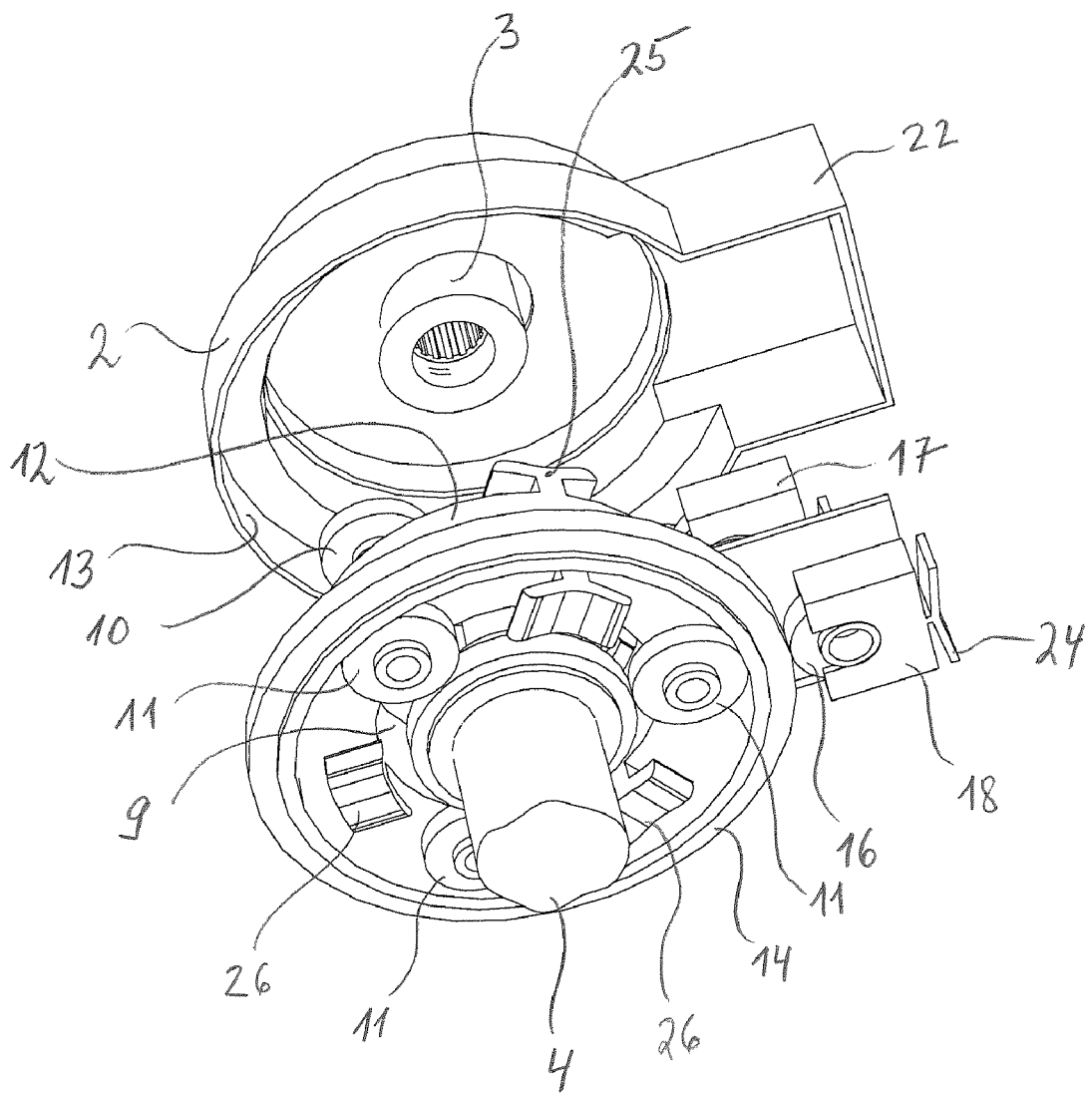
FIG. 5 a perspective, oblique view of the torsion angle sensor of FIG. 4 from the bottom.

FIGS. 2 through 5 show exploded views of the torsion angle sensor according to a concrete exemplary embodiment of the invention, wherein in FIGS. 2 and 3, for purposes of clarity, the shared planet carrier 12 is shown offset laterally from the center axis, and in FIGS. 4 and 5 the housing and/or the housing cover are shown opened.

The housing 2 has a cylindrical main body and a rectangular extension 22 to its side, in which the sensors 17 and 18 and their respective sensor gears 15 and 16 are arranged, wherein each of the two sensors 17 and 18 has its own housing which projects into the extension 22, where it is elastically supported against a spring arm 23 or 24, respectively, so that the entire sensor 17 or 18 and thus the sensor gears 15 and 16 are supported with elastic tension against their respectively assigned parts, namely the sensor gear 15 against the outer surface of the shared planet carrier 12 and the sensor gear 18 against the outer surface of the movable internal gear 14. With this spring preloading, planet gears 10 and 11 are also supported with elastic tension against the interior walls of their respectively assigned internal gears 12 and 14 and against their assigned sun gears 8 and 9, so that all the gears of the two planetary gear sets 6 and 7 are tensioned against one another such that they are free from backlash and thus also from hysteresis.

The shared planet carrier 12 also has spring arms 25 and 26 extending in both axial directions, via which the planet carrier 12 is supported against an end panel of the housing 2 or against the housing cover 19. The spring arms 25 and 26 each extend through intermediate spaces between the planetary gears 10 and 11, respectively, as is most clearly illustrated in FIGS. 4 and 5.

The planet carrier 12 has bearing bushings 27 and 28 at both of its axial end surfaces, for the rotatable mounting of planet gears 10 and 11.

As is most clearly illustrated in FIGS. 2 and 4, the second sensor 17 can have two sensor gears 15 and 15', both of which are enmeshed with the outer surface of the shared planet carrier 12. The two sensor gears 15 and 15' then have different diameters or, if toothed gears are used, different numbers of teeth. A corresponding rotational position sensor is coupled with each of the two sensor gears 15 and 15'. This allows greater precision to be achieved through a vernier effect, and, if the measuring range is greater than 360°, allows the absolute value of the angle to be determined.

The two sensors 17 and 18 are connected to an electric power source via an electric cable, not shown here, which is accessible via a plug connector 29 on the housing extension 22. During operation, the housing 2 is held non-rotatably, for example on chassis components of a motor vehicle, so that an electrical connection between a cable, not shown, and the plug connector 29 is easily feasible, especially since both sensors 17 and 18—apart from the elastic spring tension—are held fixed in the housing extension 22 by the spring arms 23 and 24.

Thus the invention provides a highly compact torsion angle sensor, with which a signal can be generated for the torsion angle and thus for a level of torque, but also for an absolute angle of rotation of a shaft.

When introducing elements of the present invention or the preferred embodiment(s) thereof, the articles "a", "an", "the" and "said" are intended to mean that there are one or more of the elements. For example, that the foregoing description and following claims refer to "an" interconnect means that there are one or more such interconnects. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense. The scope of invention is defined by the appended claims and modifications to the embodiments above may be made that do not depart from the scope of the invention.

The invention claimed is:

1. A torsion angle sensor comprising:
   a torsion bar,
   two shafts connected with one another via the torsion bar,
   first and second planetary gear sets, each of the first and second planetary gear sets including a sun gear and planet gears, wherein each sun gear is attached to a corresponding one of the two shafts,
   a shared planet carrier on which the planet gears of the first and second planetary gear sets are mounted,
   a stationary internal gear enmeshed with the planet gears of the first planetary gear set,
   a rotatable internal gear enmeshed with the planet gears of the second planetary gear set,
   a first sensor gear enmeshed with the rotatable internal gear, and
   a first rotational position sensor coupled with the first sensor gear, wherein the first rotational position sensor generates an output signal that corresponds to a torsion angle between the two shafts.

2. The torsion angle sensor of claim 1, wherein the first and second planetary gear sets and the first sensor gear are tensioned with one another so as to be backlash free.

3. The torsion angle sensor of claim 1, wherein the rotatable internal gear enmeshed with the planet gears of the second planetary gear set has external teeth, and the first sensor gear is a toothed gear.

4. The torsion angle sensor of claim 3, wherein the shared planet carrier has external teeth which are enmeshed with at least one second sensor gear embodied as a toothed gear, and wherein the second sensor gear is coupled with a second rotational position sensor, which generates an output signal that corresponds to the absolute rotational position of one of the shafts.

5. The torsion angle sensor of claim 4, wherein the second rotational position sensor is supported via a spring arm against a housing extension, and the second sensor gear is held with tension against the shared planet carrier.

6. The torsion angle sensor of claim 4, wherein the second rotational position sensor has two sensor gears which have different diameters or different numbers of teeth, and which are each coupled with a respective rotational position sensor.

7. The torsion angle sensor of claim 3, wherein the stationary internal gear of the first planetary gear set is integrated into the housing as a single piece.

8. The torsion angle sensor of claim 3, wherein each of the two planetary gear sets has three toothed gears.

9. The torsion angle sensor of claim 3, wherein the first rotational position sensor is supported via a spring arm against a housing extension, and the first sensor gear presses against the rotatable internal gear.

10. The torsion angle sensor of claim 3, wherein the shared planet carrier has spring arms that project in both axial directions, via which the shared planet carrier is elastically supported against the housing and a housing cover.

11. The torsion angle sensor of claim 1, wherein the shared planet carrier has external teeth which are enmeshed with at least one second sensor gear embodied as a toothed gear, and wherein the second sensor gear is coupled with a second rotational position sensor, which generates an output signal that corresponds to the absolute rotational position of one of the shafts.

12. The torsion angle sensor of claim 11, wherein the second rotational position sensor is supported via a spring arm against a housing extension, and the second sensor gear is held with tension against the shared planet carrier.

13. The torsion angle sensor of claim 11, wherein the second rotational position sensor has two sensor gears which have different diameters or different numbers of teeth, and which are each coupled with a respective rotational position sensor.

14. The torsion angle sensor of claim 1, wherein the stationary internal gear enmeshed with the planet gears of the first planetary gear set is integrated into the housing as a single piece.

15. The torsion angle sensor of claim 1, wherein each of the first and second planetary gear sets has three toothed gears.

16. The torsion angle sensor of claim 1, wherein the first rotational position sensor is supported via a spring arm against a housing extension, and the first sensor gear presses against the rotatable internal gear.

17. The torsion angle sensor of claim 1, wherein the shared planet carrier has spring arms that project in both axial directions, via which the shared planet carrier is elastically supported against the housing and a housing cover.

* * * * *